UNITED STATES PATENT OFFICE.

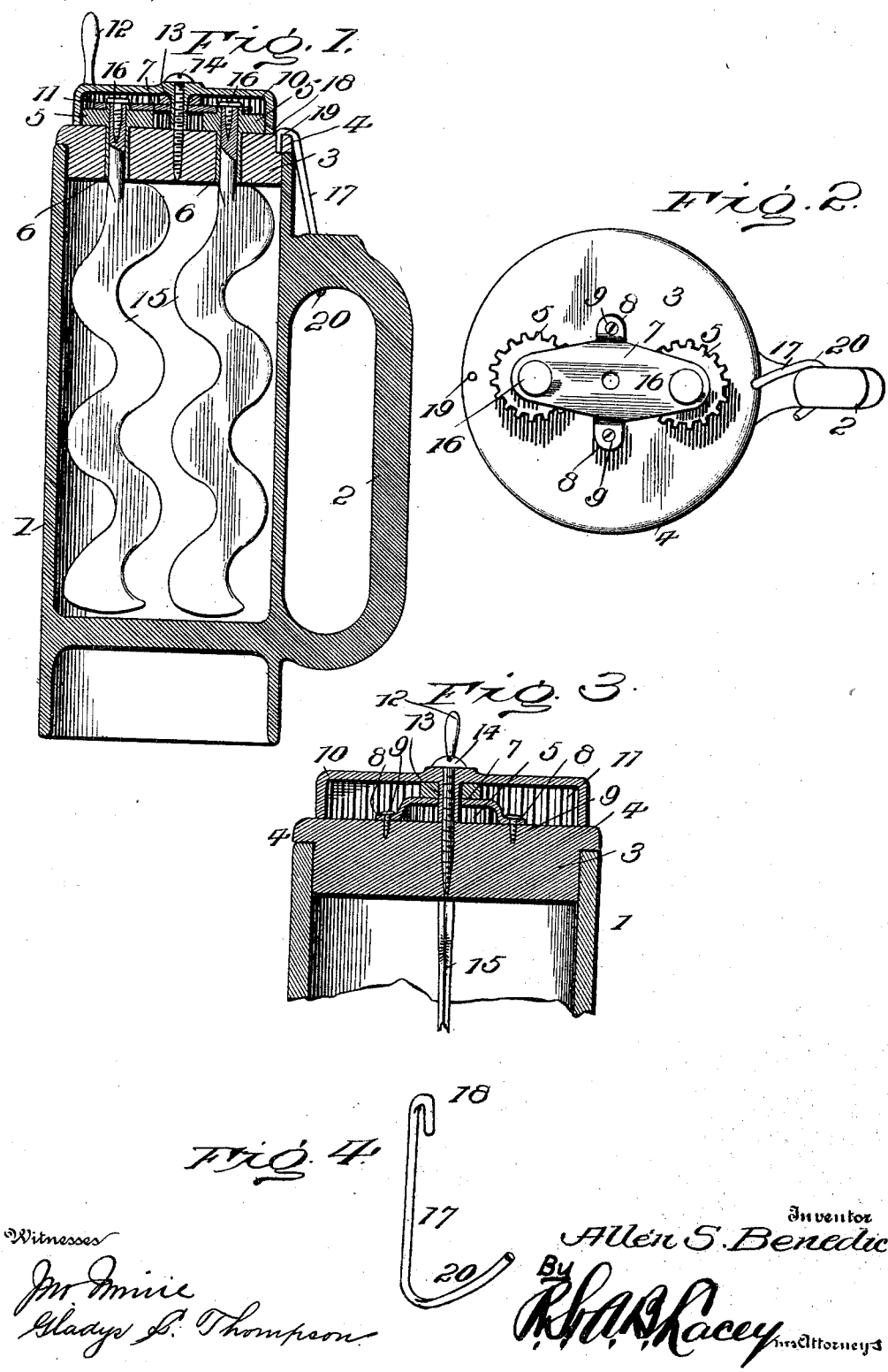

ALLEN S. BENEDICT, OF WATERTOWN, SOUTH DAKOTA.

CREAM-WHIPPER.

SPECIFICATION forming part of Letters Patent No. 670,834, dated March 26, 1901.

Application filed March 3, 1900. Serial No. 7,238. (No model.)

*To all whom it may concern:*

Be it known that I, ALLEN S. BENEDICT, a citizen of the United States, residing at Watertown, in the county of Codington and State of South Dakota, have invented certain new and useful Improvements in Cream-Whippers; and I do hereby declare the following to be a full, clear, and exact description of the invention, such as will enable others skilled in the art to which it appertains to make and use the same.

This invention has relation to machines for whipping cream, eggs, and batters, making butter, and mixing and stirring substances requiring violent agitation, the purpose being to provide a novel driving mechanism, means for connecting the whippers or beaters to the driven gear elements, and an attaching device for holding the cover in place against vertical and rotary movements.

With these and such other ends in view as appertain to the nature and scope of the invention the latter consists, essentially, of the novel features, details of construction, and combinations of parts which hereinafter will be more fully described, illustrated, and claimed.

In the drawings forming a part of this application, Figure 1 is a vertical central section of an apparatus specially designed for attaining the ends of the invention. Fig. 2 is a top plan view, the crown of the master-gear or driver being omitted to show the relation of the gear elements and their mountings more clearly. Fig. 3 is a transverse section of the cover, showing the upper portion of the vessel and whipper or beater. Fig. 4 is a detail view of the hook.

Corresponding and like parts are referred to in the following description and indicated in all the views of the drawings by the same reference characters.

The vessel 1 for containing the cream, eggs, batter, or other article to be whipped or beaten may be of any size, shape, or form and, as illustrated, is provided on one side with a handle 2 and has the form of a drinking-glass. The handle 2 plays an important part in the organization of the apparatus, since it provides a convenient means for handling and also serves as an anchorage for the fastening means, which will appear more fully hereinafter.

A cap or cover is constructed to close the upper end of the vessel 1 and fits thereon snugly, so as to prevent lateral movement, and is formed with a projecting portion 4 to overlie the upper edge of the vessel and support the cover and driving mechanism thereon. Gear-wheels 5 are placed upon the cover 3 upon opposite sides of a central point and are provided with vertical and pendent hollow gudgeons 6, which obtain bearings, respectively, in a plate 7 and the cover 3, said plate 7 being of oblong form and provided with lateral extensions 8, apertured to receive screws or like fastenings 9, by means of which said plate is secured to the cover. A master-wheel or driver 10 of cap form has its rim internally toothed, as shown at 11, to mesh with the teeth of the gear-wheels 5, so as to impart a simultaneous movement thereto. By having the master-wheel or driver constructed as set forth it completely houses the gear-wheels 5 and plate 7 and affords protection therefor. A crank-handle 12 is applied to the master-wheel and is grasped when it is required to impart rotation thereto. A hollow bearing 13 is provided centrally of the master-wheel and is journaled in the plate 7 and cover 3 and receives the screw or fastening 14, by means of which the master-gear is held in place. Said fastening 14 in addition to holding the master-gear 10 in place constitutes a bearing for the part 13.

The whippers or beaters 15 may be of any desired formation and are secured at their upper ends to the respective gear-wheels. In the preferable formation of the whippers they are given a serpentine outline and are disposed with the projecting portions of one opposite the hollow spaces of the other, as shown most clearly in Fig. 1. The upper ends of the whippers or beaters are reduced and are fitted into the hollow gudgeons 6 of the gear-wheels and are held in place by screws or like fastenings 16, the heads of said screws overlapping the upper gudgeon 6, so as to prevent displacement of the whippers.

As previously stated, the cap or cover 3 is loosely fitted to the upper end of the vessel 1, and in order to prevent displacement thereof and rotation when operating the whippers it has been found expedient to provide fastening means, the latter, as shown, consisting of a stout wire 17, having its upper end bent into the form of a hook 18 to engage an opening 19 in the cover 3 and having its lower end bent to form a hook 20 to engage the upper portion of the handle 2. The hook 20 is constructed to be forced under the upper portion of the handle 2, and when in position holds the cover in place, and when required can be readily disengaged from the handle to admit of the cover and parts being easily removed. The vessel being circular in cross-section and the cover of corresponding outline and carrying the driving mechanism, the provision of means to prevent turning of the cover upon the said vessel becomes imperative. The hook 20 of the fastening 17 is comparatively long and slightly curved and stands in a plane at a right angle to the hook 18 and is adapted to engage under the upper arm of the handle 2 by a spring action. The curvature of the attaching end 20 is formed approximately on the arc of a circle whose center about corresponds with the hook 18, so as to admit of the part 20 being engaged with and disengaged from the handle by a swinging movement of the fastening and a slight rotary movement of the cover 3.

The manner of attaching the whippers or beaters to the gear-wheels 5 admits of their displacement for cleaning, repairing, or any desired purpose without necessitating the removal of the gear-wheel, it being necessary only to remove the screw or fastening 16, when the whippers can be either removed or placed in position, as will be readily comprehended.

Having thus described the invention, what is claimed as new is—

1. A vessel of circular outline in cross-section and having a side handle, and a circular cover having a portion fitted in the open end of the vessel and a part to overlie the top edge thereof and provided with rotary beaters and actuating mechanism therefor, and having a vertical opening in the top side near its outer edge, and a fastening to prevent turning of the cover and to hold it in place, the same consisting of a wire having a hook at one end to engage the opening in the top side of the cover and having its opposite end curved about on the arc of a circle whose center corresponds approximately with the aforementioned hook end and adapted to engage with the handle of the vessel by a spring action, substantially as described.

2. In combination with a vessel, and a cover therefor, beaters having their upper end portions reduced and passed through openings in the cover, pinions fitted to the reduced ends of the beaters and having upper and lower gudgeons, the lower gudgeons obtaining bearings in the cover and reinforcing the reduced terminal portions of the beaters, a plate secured to the cover and receiving the upper gudgeons, means applied to the reduced ends of the beaters to secure them to the pinions and overlapping the said plate, a hollow master-wheel inclosing the plate and pinions and having a central bearing journaled in the said plate, and a fastening for securing the master-wheel to the cover and forming a journal therefor, substantially as described.

In testimony whereof I affix my signature in presence of two witnesses.

ALLEN S. BENEDICT. [L. S.]

Witnesses:
E. C. ANNIS,
G. W. MARCHANT.